United States Patent
Hirano et al.

(10) Patent No.: US 6,495,944 B2
(45) Date of Patent: Dec. 17, 2002

(54) ELECTROSTATIC MICROACTUATOR WITH VISCOUS LIQUID DAMPING

(75) Inventors: Toshiko Hirano, San Jose, CA (US); Dan S. Kercher, Santa Cruz, CA (US); Charles M. Mate, San Jose, CA (US)

(73) Assignee: International Business Machines Corporation, Armonk, NY (US)

(*) Notice: Subject to any disclaimer, the term of this patent is extended or adjusted under 35 U.S.C. 154(b) by 0 days.

(21) Appl. No.: 09/838,088

(22) Filed: Apr. 18, 2001

(65) Prior Publication Data

US 2002/0153804 A1 Oct. 24, 2002

(51) Int. Cl.[7] ................................................ H02N 1/00
(52) U.S. Cl. ........................ 310/309; 360/294.3; 137/1
(58) Field of Search ...................... 310/309; 360/294.3, 360/294.1; 137/1

(56) References Cited

U.S. PATENT DOCUMENTS

| 5,417,235 A | * | 5/1995 | Wise et al. ..................... 137/1 |
| 5,745,281 A |   | 4/1998 | Yi et al. ...................... 359/290 |
| 5,801,472 A | * | 9/1998 | Wada et al. ................. 250/309 |
| 5,995,334 A |   | 11/1999 | Fan et al. .................... 360/106 |
| 6,359,757 B1 | * | 3/2002 | Mallary ......................... 137/1 |

OTHER PUBLICATIONS

L. Fan, et al., "Electrostatic Microactuator and Design Considerations for HDD Applications," IEEE Transactions on Magnetics, vol. 35, No. 2, Mar. 1999, pp. 1000–1005.
J. Lee, et al., "Surface–Tension–Driven Microactuation Based on Continuous Electrowetting," Journal of Microelectromechanical Systems, vol. 9, No. 2, Jun. 2000, pp. 171–180.

* cited by examiner

*Primary Examiner*—Burton S. Mullins
(74) *Attorney, Agent, or Firm*—Thomas R. Berthold

(57) ABSTRACT

A micro-electro-mechanical systems (MEMS) type electrostatic microactuator has a fixed electrode and a movable electrode, with the movable electrode being attached to the substrate by a flexure. Each electrode has a plurality of fingers with the fixed electrode fingers and the movable electrode fingers interleaved in a comb-like arrangement. A nonconductive viscous liquid is located between the fingers for damping motion of the movable electrode relative to the fixed electrode. The liquid is held in a reservoir attached to the movable electrode. Capillary pressure pulls the liquid from the reservoir into the small gaps between the interleaved fingers.

18 Claims, 4 Drawing Sheets

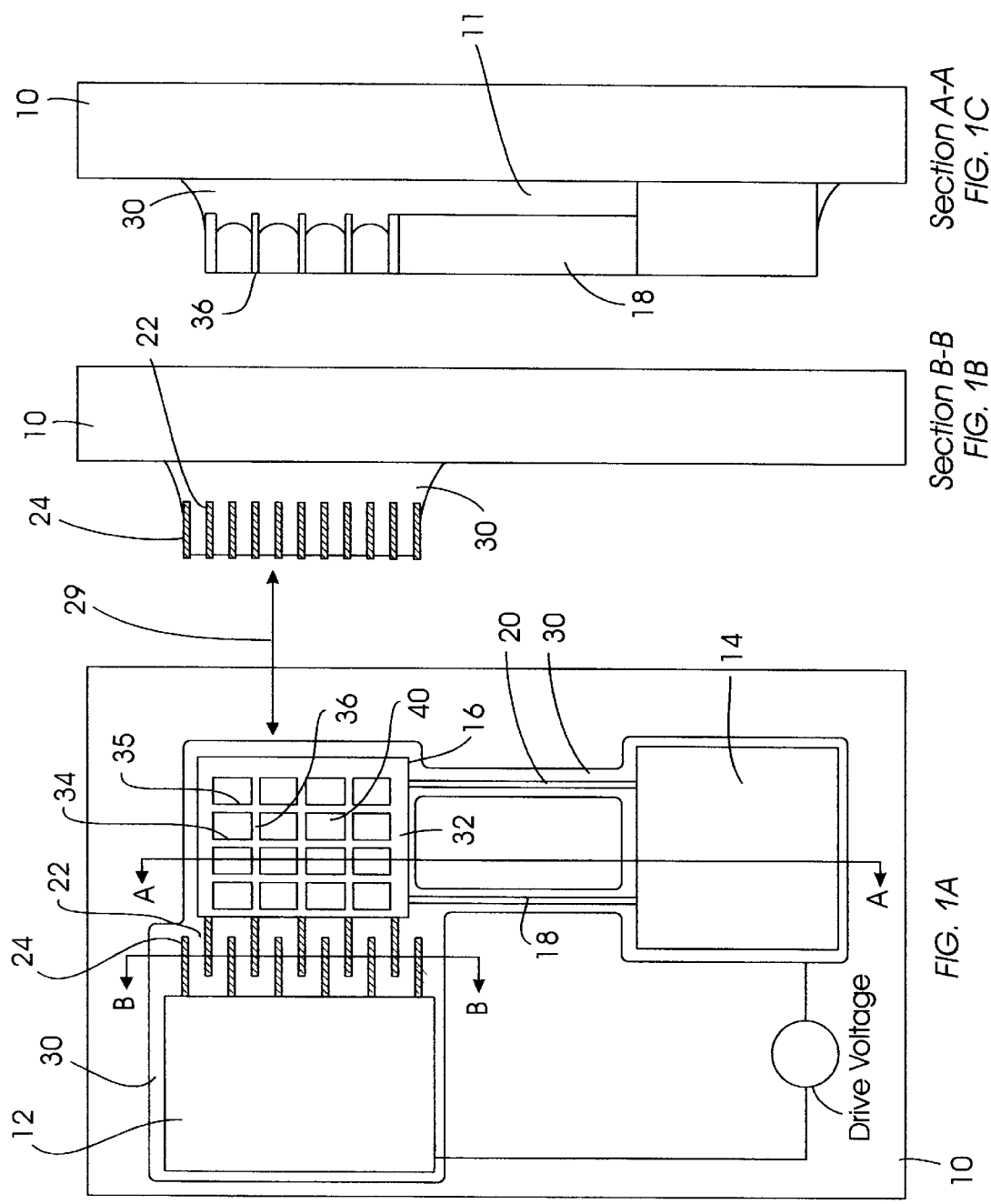

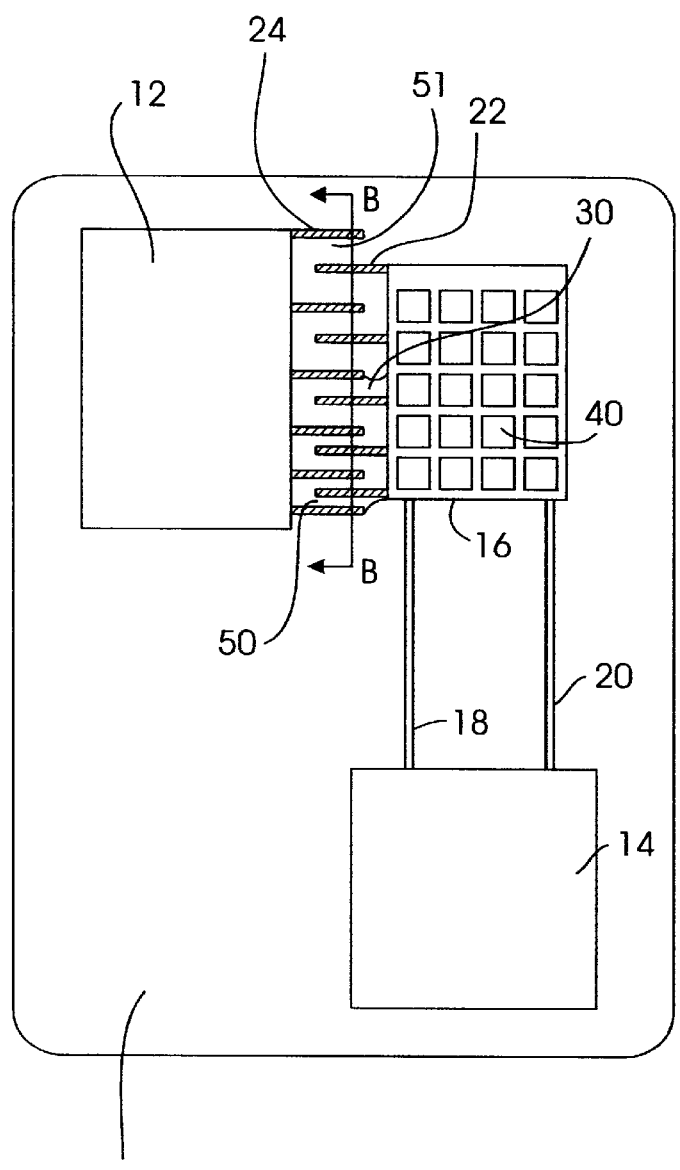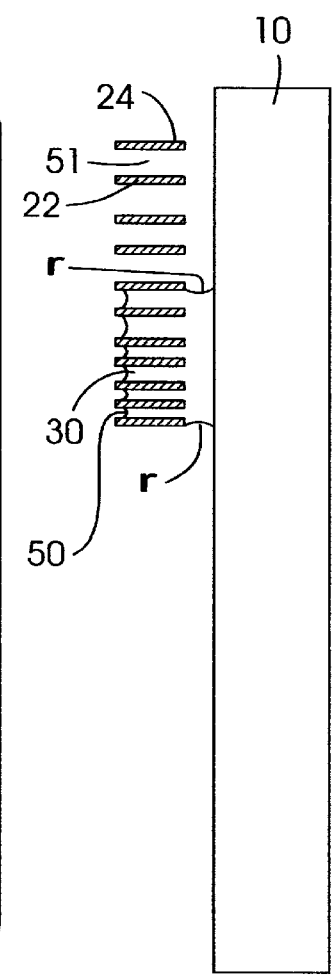
FIG. 2A
FIG. 2B
Section B-B

ELECTROSTATIC MICROACTUATOR WITH VISCOUS LIQUID DAMPING

TECHNICAL FIELD

This invention relates generally to micro-electro-mechanical systems (MEMS), and more specifically to MEMS electrostatic microactuators.

BACKGROUND OF THE INVENTION

MEMS devices are basically "micro" systems that incorporate some type of electromechanical transduction to achieve a given function. In this case, "micro" refers to component features of the order of micrometers. Examples of MEMS microactuators include micropumps, micromotors, micro-optical mirrors, and micropositioners.

A typical MEMS microactuator is fabricated using semiconductor process technology and uses a flexure or spring-like structure to support a movable component or member. Microactuators can be driven using electrostatic forces, magnetic forces, thermal expansion of materials, piezoelectric effects, or surface tension forces. A device based on microactuation by surface tension of a metallic liquid is described by J. Lee et al., "Surface-Tension-Driven Microactuation Based on Continuous Electrowetting", *JOURNAL OF MICELECTROMECHANICAL SYSTEMS*, Vol. 9, No. 2, June 2000, 171–180. A rotary type electrostatic microactuator that uses interdigitated or interleaved fingers for micropositioning the read/write head supported on an air bearing slider in a magnetic recording disk drive is described by L-S Fan et al., "Electrostatic Microactuator and Design Considerations for HDD Applications", *IEEE TRANSACTIONS ON MAGNETICS*, Vol. 35, No. 2, March 1999, 1000–1005, and also in IBM's patent U.S. Pat. No. 5,995,334.

A common problem of microactuators, especially those that use spring-like structures to support a movable member, like electrostatic microactuators with interleaved fingers, is a relatively large vibration at a structural resonant frequency, resulting in amplification of external disturbances at that frequency. This not only severely degrades the positional accuracy of this type of microactuator but also makes difficult the closed-loop control of microactuator motion. U.S. Pat. No. 5,745,281 describes an electrostatic light modulator with a shutter that moves within a chamber containing a dielectric liquid for damping movement of the shutter.

What is needed is an electrostatic microactuator with interleaved fingers that has minimal or no resonant vibration.

SUMMARY OF THE INVENTION

The invention is a micro-electro-mechanical systems (MEMS) type electrostatic microactuator with viscous liquid damping. The MEMS substrate supports a fixed electrode and a movable electrode, with the movable electrode being attached to the substrate by a flexure. Each electrode has a plurality of fingers with the fixed electrode fingers and the movable electrode fingers interleaved in a comb-like arrangement. A nonconductive liquid is located between the fingers for damping motion of the movable electrode relative to the fixed electrode. The liquid is held in a reservoir attached to the movable electrode. Capillary pressure pulls the liquid from the reservoir into the small gaps between the interleaved fingers.

In one embodiment the reservoir is a plurality of cells, with each cell having a wall spacing greater than the gap spacing between the fingers. As a result, the capillary pressure in a partially filled reservoir cell will be less than the capillary pressure in a partially filled gap. Only when the gaps are full can the capillary pressure in the gaps equal the pressure in the partially filled reservoir, ensuring that the gaps stay full as long as liquid remains in the reservoir, even if liquid is lost over time from the microactuator. In another embodiment the gaps for different sets of adjacent fingers have different sizes so the amount of damping is controlled by changing the number of gaps with sizes less than the reservoir cell wall spacing or by changing the cell wall spacing to allow a different number of cells to be filled with liquid.

For a fuller understanding of the nature and advantages of the present invention, reference should be made to the following detailed description taken together with the accompanying figures.

BRIEF DESCRIPTION OF THE DRAWING

FIG. 1A is a plan view of an electrostatic microactuator according to the present invention.

FIGS. 1B and 1C are sectional views taken through the microactuator sections B—B and C—C, respectively, of FIG. 1A.

FIG. 2A is a plan view of an alternative embodiment of the microactuator of the present invention showing the interleaved fingers with different gap spacings.

FIG. 2B is view of section B—B of the microactuator of FIG. 2A.

DETAILED DESCRIPTION OF THE INVENTION

Figure 3:
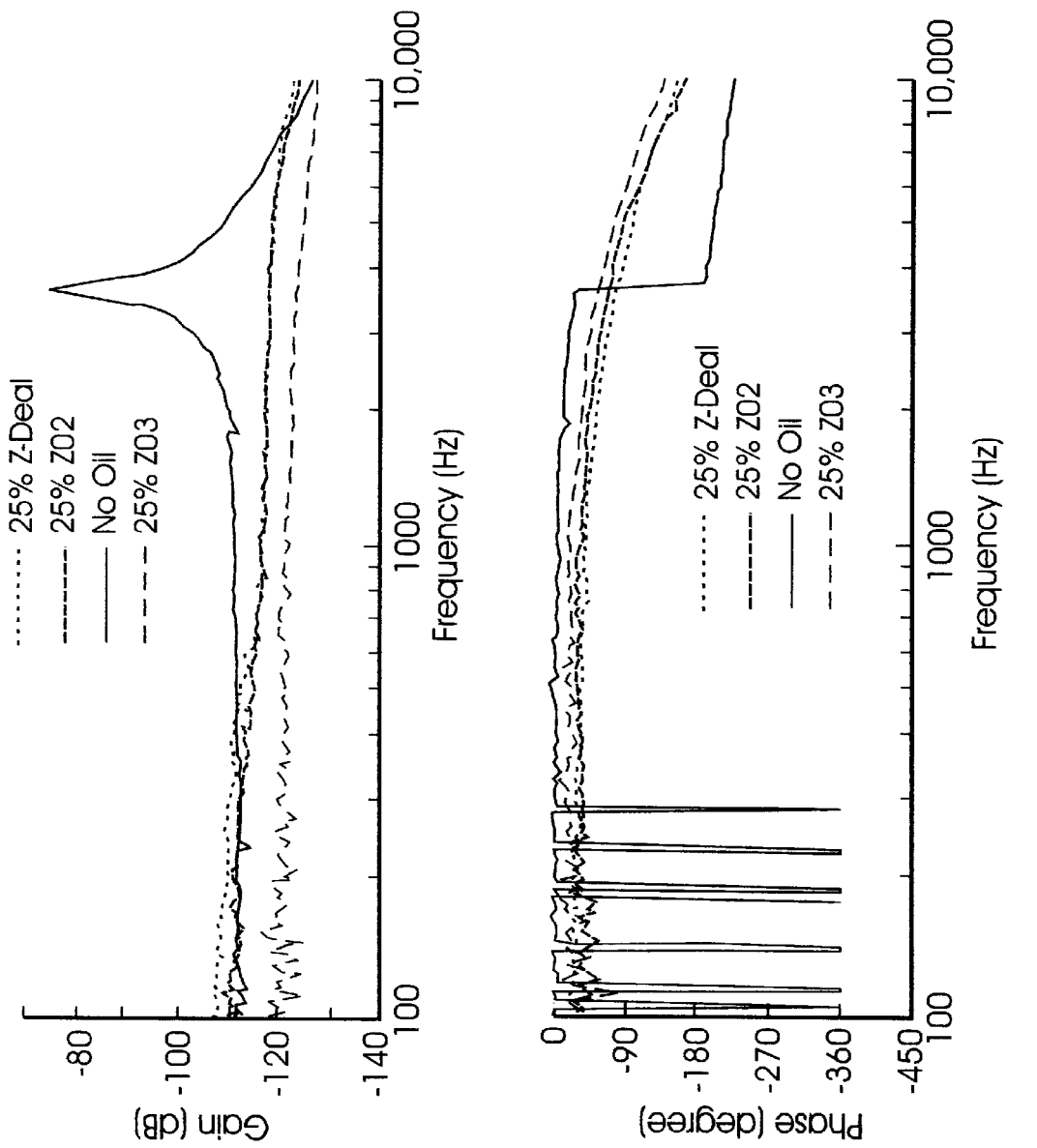
FIG. 3 is a plot of amplitude and phase as a function of frequency for a slider-microactuator-suspension assembly with damping liquids of different viscosities.

A electrostatic microactuator with a comb-like set of interdigitated or interleaved fingers is shown in FIGS. 1A-1. The stationary support structures 12, 14 are formed on a suitable substrate 10. The movable element 16 is attached to fixed support 14 by a pair of spring-like or flexible support beams or arms 18, 20 that are separated from the substrate 10 by a small gap 11 (FIG. 1C). The movable element 16 has a plurality of fingers 22 that are located with the spaces of a similar plurality of fingers 24 on fixed support 12. A set of adjacent fingers is one finger on the fixed support 12 and its adjacent neighbor finger on element 16. The sets of fingers thus form a comb-like structure of interleaved fingers. An electrostatic driving force on the microactuator is generated by applying a voltage between the fixed structure 12 and the fixed structure 14 that is connected to movable element 16. The fixed structure 12 and its fingers 24 form one electrode and the movable element 16 and its fingers 14 form the other electrode. The applied voltage generates static charges on the electrodes that causes the movable element 16 to be either attracted to or repelled from the fixed support 12, depending on the applied voltage. The element 16 thus moves along the direction of actuation indicated by arrow 29.

The substrate 10 is typically silicon with a suitable metal seed layer. A release layer of silicon dioxide is then deposited in those regions where the movable portions of the microactuator are to be located. A polymer layer is then formed on the substrate and patterned with deep reactive ion etching to form a stencil into which nickel or a nickel alloy is electroplated to form the structures 12, 14, element 16, and arms 18, 20. The release layer is then dissolved to separate the movable portions from substrate 10, resulting in gap 11. Specific details on the materials and fabrication processes for electrostatic microactuators like that shown in FIGS. 1A-1 are well known, as described for example in the previously cited IBM paper and patent.

As shown in FIG. 1A and the cross-sectional views of FIGS. 1B and 1C, the electrostatic microactuator according to the present invention includes a nonconductive viscous damping fluid, represented by item 30, located primarily between the sets of fingers 22, 24, but also in a reservoir 32 within element 16 and in contact with the other surfaces of the microactuator. The viscous liquid provides damping when the movable element 16 moves relative to the stationary structure 12. This viscous damping occurs primarily as a result of the liquid located between the interleaved fingers because the fingers have a relatively large surface area in contact with the liquid. However, the liquid located between the movable element 16 and the substrate 10 will also provide some damping.

Because the microactuator is very small (less than 1 mm across), liquid that wets the surfaces of the microactuator can move relatively quickly from one area of the microactuator to another. The movement of liquid stops when the capillary pressure of the liquid in all parts of the microactuator achieves the same value. (Capillary pressure $P_{cap}=\gamma/r$, where $\gamma$=liquid surface tension and r=radius of curvature of the liquid meniscus.) The attractive capillary pressure also serves to pull liquid into the small gaps between the microactuator components where damping occurs. The amount of damping is controlled both by the choice of the liquid viscosity and by the degree to which the gaps between the microactuator components are filled with liquid.

The reservoir 32 in movable element 16 is a grid formed by intersecting walls, such as walls 34, 35, 36. These walls define individual cells, such as typical cell 40, that hold the liquid. For the cells to serve as reservoirs, their dimensions, as defined by the wall spacing, must be greater than the gaps between the fingers 22, 24, so that the capillary pressure in a partially filled cell will be less than the capillary pressure in a partially filled gap. Only when the gaps are full can the capillary pressure in the gaps equal the pressure in the partially filled reservoir, ensuring that the gaps stay full as long as liquid remains in the reservoir, even if liquid is lost over time from the microactuator.

Because the microactuator has interleaved fingers 22, 24, the viscous liquid provides an additional benefit of higher output force due to the larger dielectric constant of a liquid, as compared to gas, such as air, since the output force is proportional to the dielectric constant of the gap between the fingers.

The microactuator according to the present invention can also have gaps between the fingers that have different separation distances, as shown in FIG. 2A and in FIG. 2B, which is a sectional view of FIG. 2A through the fingers 22, 24. When a very small amount of liquid 30 is applied to the microactuator, capillary pressure will pull liquid in to fill the narrowest gap 50. As more liquid is added, other gaps fill up, increasing the damping until all the gaps are full. This effect is illustrated in FIGS. 2A–2B, where the gaps smaller than the reservoir cell dimension, such as gap 50, are filled, and the gaps larger than the cell dimension, such as gap 51, are empty, so that the radius of curvature of the menisci r is the same everywhere. The amount of damping is controlled by changing the number of gaps with sizes less than the cell dimension or by changing the cell dimension to allow a different number of cells to be filled.

There are several methods for applying the viscous liquid, which offer good control of the amount of liquid applied. These include:

1) Directly placing a liquid droplet with a well-controlled volume onto the microactuator, for example, by using a syringe.

2) Dipping the microactuator into a solution of the viscous liquid dissolved in a volatile solvent. Once the microactuator is withdrawn from the solution, the solvent starts to evaporate. During evaporation, capillary pressure pulls the concentrated solution into the gaps of the microactuator until all the solvent is evaporated. The amount of liquid that remains in and on the microactuator can be controlled by varying the solution concentration and the withdrawal speed of the microactuator from the solution.

3) Condensing the liquid from a vapor into the gaps. If the microactuator is placed in a container with sufficiently high vapor pressure of the damping liquid, capillary condensation of liquid will occur in the small gaps within the microactuator. This capillary condensation can be promoted by the presence of an electric field in the microactuator gaps. The electric field can be generated by applying a voltage across the fabrication station and the movable parts during deposition.

The application of the liquid may result in liquid being deposited in areas outside the microactuator where it is not desired. This problem can be addressed in several ways:

1) After deposition, excess liquid is removed by dipping the device into a rinse bath of pure solvent. Thin liquid films in areas outside the filled gaps will quickly dissolve into the solvent. The liquid in the filled gaps, however, takes longer to dissolve into the rinse bath.

2) Areas where liquid deposition is not desired are covered with material, such as an "anti-wetting agent" (AWA), that has a surface energy lower than the liquid surface tension so that the liquid does not wet these areas during application.

3) The rinse bath can have a dilute concentration of soluble AWA. During withdrawal from the rinse bath the AWA is deposited on the areas where the rinse bath has completely removed the viscous liquid. The AWA coating in these areas then acts as a migration barrier for retarding the flow of liquid away from the microactuator.

An electrostatic microactuator similar to that described in the previously cited IBM paper and patent, when mounted between the air bearing slider and the suspension of a magnetic recording disk drive, is known to have a resonant frequency of about 3.5 kHz due to air flow over the microactuator from the rotating disks. Low viscosity perfluoropolyether (PFPE) liquids were deposited between the fingers of the comb in this microactuator in an attempt to damp this resonance. Three Fomblin® PFPE liquids from Ausimont Montedison Group, Z02, Zdeal, and Z03, with viscosities of 12, 20, and 34 centi-Stokes ($10^{-6} m^2/sec$), respectively, were applied to the microactuator to test the damping effect. The PFPE liquid was applied by first dipping the slider-microactuator-suspension assembly into a 25% solution of the PFPE liquid dissolved in perfluorohexane solvent. After the solvent evaporated the electrostatic comb structures were completely filled with the liquid. The assembly was then briefly dipped into pure perfluorohexane to remove the excess PFPE liquid from the slider and suspension surfaces. FIG. 3 shows the frequency response of this microactuator for different viscosity PFPE liquids. The X-axis is the applied driving frequency and the Y-axis is the ratio of displacement amplitude/driving-voltage amplitude (Gain). When there is no liquid present on the microactuator, there is a large amplitude peak at 3.7 kHz due to mass-spring resonance. When any of the three PFPE liquids are applied that peak is completely eliminated. ZDeal has the highest low frequency gain due to its high (3.7) dielectric constant. Z03 has the highest viscosity and thus the low frequency gain is the lowest because of over-damping.

Figure 4:
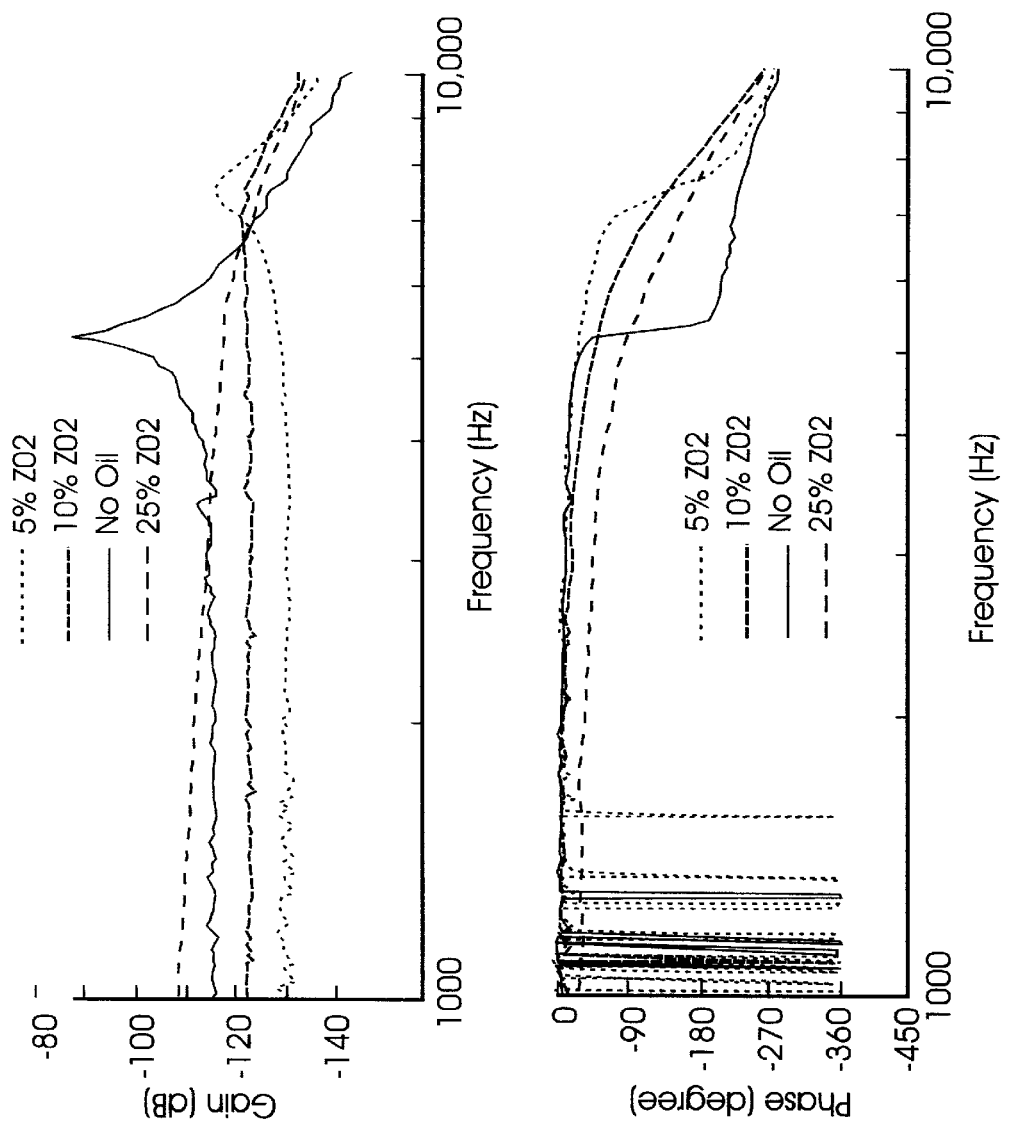
FIG. 4 is a plot of amplitude and phase as a function of frequency for a slider-microactuator-suspension assembly with different amounts of the same viscous damping liquid.

The amount of damping can be controlled by varying the amount of liquid applied, as demonstrated in FIG. 4. Here different amounts of Z02 were applied by varying the percent by volume dissolved in the first dip of perfluorohexane solvent. FIG. 4 shows that increasing the amount of PFPE deposited is found to increase the amount of damping.

In the above-described experiments the viscous damping liquid was PFPE. When the microactuator is used in a disk drive to provide micro-positioning of the read/write head, the PFPE damping liquid provides an additional advantage in that it has a chemical structure similar to or identical to the liquid that is used as the lubricant on the disk surface. Thus depletion of the PFPE from the microactuator into the disk drive or migration of the PFPE to the disk surface will have minimal adverse effect on operation of the disk drive. However, any other nonconductive liquid with the desired properties may be used as the damping liquid. Such a liquid would have the desired viscosity, chemical and physical stability, high dielectric constant, high dielectric breakdown strength (the ability to sustain high electric field without arcing), and the ability to wet the microactuator surfaces. In addition to PFPE, such liquids include polydimethylsiloxane (PDMS), water, ethanol, methanol, ethylene glycol, formamide, and diffusion pump oils such as those selected from phenylpolysiloxanes and polyphenylethers.

While the present invention has been particularly shown and described with reference to the preferred embodiments, it will be understood by those skilled in the art that various changes in form and detail may be made without departing from the spirit and scope of the invention. Accordingly, the disclosed invention is to be considered merely as illustrative and limited in scope only as specified in the appended claims.

What is claimed is:

1. An electrostatic microactuator comprising:
   a substrate;
   a first structure fixed to the substrate and having a plurality of fingers;
   a spring-like structure having one end fixed to the substrate;
   a movable element attached to the other end of the spring-like structure and having a plurality of fingers, the fingers of the movable element and the fingers of the fixed structure being interleaved in a comb-like arrangement with gaps between adjacent fingers;
   a liquid located in the gaps and in contact with the fingers of the movable element and the fixed structure; and
   a reservoir for the liquid, the reservoir including a plurality of cells, each cell having at least two spaced-apart walls.

2. The microactuator according to claim 1 wherein the spacing between the walls of at least one cell is greater than the gap between at least one set of adjacent fingers.

3. The microactuator according to claim 1 wherein the spacing between the walls of at least one cell is greater than the gaps between all sets of adjacent fingers.

4. The microactuator according to claim 1 wherein the gap for each set of adjacent fingers has a size different from the gaps of all other sets of adjacent fingers.

5. The microactuator according to claim 1 wherein the reservoir is attached to the movable element.

6. The microactuator according to claim 1 wherein the liquid is a perfluoropolyether.

7. The microactuator according to claim 1 further comprising an anti-wetting agent located on portions of the microactuator.

8. A micro-mechanical systems (MEMS) type electrostatic microactuator having a substrate supporting a fixed electrode and a movable electrode, each electrode having a plurality of fingers, the fixed electrode fingers and the movable electrode fingers being interleaved with gaps between adjacent interleaved fingers, the microactuator including a nonconductive liquid located in the gaps and in contact with the fingers for damping motion of the movable electrode relative to the fixed electrode and an anti-wetting agent located on portions of the microactuator for preventing the liquid from contacting said anti-wetting portions.

9. The microactuator according to claim 8 further comprising a reservoir for the liquid.

10. The microactuator according to claim 9 wherein the reservoir includes a plurality of cells, each cell having at least two spaced-apart walls.

11. The microactuator according to claim 10 wherein the spacing between the walls of at least one cell is greater than the gap between at least one set of adjacent fingers.

12. The microactuator according to claim 10 wherein the spacing between the walls of at least one cell is greater than the gaps between all sets of adjacent fingers.

13. The microactuator according to claim 9 wherein the reservoir is attached to the movable electrode.

14. The microactuator according to claim 8 wherein the gap for each set of adjacent fingers has a size different from the gaps of all other sets of adjacent fingers.

15. The microactuator according to claim 8 wherein the liquid is a perfluoropolyether.

16. A micro-mechanical systems (MEMS) type electrostatic microactuator having a substrate supporting a fixed electrode and a movable electrode, each electrode having a plurality of fingers, the fixed electrode fingers and the movable electrode fingers being interleaved with gaps between adjacent interleaved fingers, the microactuator including a nonconductive liquid located in the gaps and in contact with the fingers for damping motion of the movable electrode relative to the fixed electrode and a reservoir for the liquid, the reservoir including a plurality of cells with each cell having at least two spaced-apart walls.

17. A micro-mechanical systems (MEMS) type electrostatic microactuator having a substrate supporting a fixed electrode and a movable electrode, each electrode having a plurality of fingers, the fixed electrode fingers and the movable electrode fingers being interleaved with gaps between adjacent interleaved fingers, wherein the gap for each set of adjacent interleaved fingers has a size different from the gaps of all other sets of adjacent interleaved fingers, the microactuator including a nonconductive liquid located in the gaps and in contact with the fingers for damping motion of the movable electrode relative to the fixed.

18. A micro-mechanical systems (MEMS) type electrostatic microactuator having a substrate supporting a fixed electrode and a movable electrode, each electrode having a plurality of fingers, the fixed electrode fingers and the movable electrode fingers being interleaved with gaps between adjacent interleaved fingers, the microactuator including a nonconductive liquid located in the gaps and in contact with the fingers for damping motion of the movable electrode relative to the fixed electrode, and a reservoir for the liquid, the reservoir being attached to the movable electrode.

* * * * *